US006928052B2

(12) United States Patent
Packer (10) Patent No.: US 6,928,052 B2
(45) Date of Patent: Aug. 9, 2005

(54) METHOD FOR EXPLICIT DATA RATE CONTROL IN A PACKET COMMUNICATION ENVIRONMENT WITHOUT DATA RATE SUPERVISION

(75) Inventor: Robert L. Packer, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 15 days.

(21) Appl. No.: 10/790,272

(22) Filed: Mar. 1, 2004

(65) Prior Publication Data

US 2004/0174886 A1 Sep. 9, 2004

Related U.S. Application Data

(60) Continuation of application No. 09/944,746, filed on Aug. 31, 2001, now Pat. No. 6,741,563, which is a continuation of application No. 09/300,036, filed on Apr. 27, 1999, now Pat. No. 6,298,041, which is a division of application No. 08/742,994, filed on Nov. 1, 1996, now Pat. No. 6,038,216.

(51) Int. Cl.$^7$ .............................................. H04L 12/26
(52) U.S. Cl. ........................ 370/231; 370/232; 370/235
(58) Field of Search ................................. 370/229–238

(56) References Cited

U.S. PATENT DOCUMENTS

| | | | |
|---|---|---|---|
| 5,042,029 | A | 8/1991 | Hayakawa |
| 5,193,151 | A | 3/1993 | Jain |
| 5,359,593 | A | 10/1994 | Derby et al. |
| 5,426,635 | A | 6/1995 | Mitra et al. |
| 5,455,826 | A | 10/1995 | Ozveren et al. |
| 6,119,235 | A | 9/2000 | Vaid et al. |
| 6,560,243 | B1 | 5/2003 | Mogul |
| 2002/0159396 | A1 | 10/2002 | Carlson et al. |
| 2002/0172153 | A1 | 11/2002 | Vernon |
| 2003/0097461 | A1 | 5/2003 | Barham et al. |

OTHER PUBLICATIONS

Huynh et al., "Performance Comparison Between TCP Slow–Start and a New Adaptive Rate–Based Congestion Avoidance Scheme," Proceedings of the Second Int'l Workshop on Modeling, Analysis, and Simulation of Computer and Telecommunications Systems, IEEE 1994.

Haas, "Adaptive Admission Congestion Control," Computer Communication Review, vol. 21, No. 5, ACM SIGCOMM 1991.

Ramakrishnan et al., "A Binary Feedback Scheme for Congestion Avoidance in Computer Networks," ACM Transactions on Computer Systems, vol. 8, No. 2, ACM Press 1990.

Choi et al., "On Acknowledgment Schemes of Sliding Window Flow Control," IEEE Transactions on Communications, vol. 37, No. 11, IEEE 1989.

Comer et al., "A Rate–Base Congestion Avoidance and Control Scheme for Packet Switched Networks," Proceedings of the 10$^{th}$ Int'l Conference on Distributed Computing Systems, IEEE 1990.

Dighe et al., "Congestion Avoidance Strategies in Broadband Packet Networks," Proceedings vol. 1: IEEE Infocom '91, IEEE 1991.

Aagesen, "A Flow Management Architecture for B–ISDN," Proceedings of the IPIP TC6/ICCC Int'l Conference on Integrated Broadband Communication Networks and Services, 1994.

(Continued)

Primary Examiner—Melvin Marcelo
(74) Attorney, Agent, or Firm—Mark J. Spolyar (57) ABSTRACT

A method for explicit data rate control is introduced into a packet communication environment (10) which does not have data rate supervision by adding latency to the acknowledgment (ACK) packet and by adjusting the size of the flow control window associated with the packet in order to directly control the data rate of the source data at the station (12 or 14) originating the packet.

35 Claims, 10 Drawing Sheets

OTHER PUBLICATIONS

Chakrabarti et al., "Adaptive Control for Packet Video," Proceedings of the Int'l Conference on Multimedia Computing Systems, IEEE 1994.

Bolot et al., "A Rate Control Mechanism for Packet Video in the Internet," Proceedings vol. 3: IEEE INFOCOM '94, IEEE 1994.

Hong et al., "Performance Evaluation of Connectionless Service for ATM Networks," Proceedings vol. 2/3: IEEE Global Telecommunications Conference (GLOBECOM'95), IEEE 1995.

Kanakia et al., "An Adaptive Congestion Control Scheme for Real–Time Packet Video Transport," Proceedings Communications Architectures, Protocols and Applications (SIGCOMM '93), ACM Press 1993.

Gong et al., "Study of a Two–Level Flow Control Scheme and Buffering Strategies," Proceedings vol. 3: IEEE INFOCOM '94, IEEE 1994.

Song et al., "An Algorithm for Flow and Rate Control of XTP," IEEE Int'l Conference on Communications '93 (IGC '93), IEEE 1993.

Gerla et al., "Comparing ATM Credit–Based and Rate–Based Controls for TCP Sources," MILCOM 95, Universal Communications, Conference Record, vol. 1, IEEE 1995.

Jacobson, "Congestion Avoidance and Control," SIGCOMM '88 Symposium: Communications Architectures & Protocols, ACM Press, 1998.

Balakrishnan, H., et al., "Improving TCP/IP Performance Over Wireless Networks", Proc. of 1 .sup.st AMC Conf. on Mobile Computing and Networking, Berkeley, CA, pp. 1–10 (Nov. 1995).

Gong et al., "Study of a two level flow control scheme and buffering Strategies", INFOCOM '94 Networking for Global Communications, 13 .sup.th Proceedings IEEE (94CH3401–7), vol. 3, pp. 1124–1233 (Jun. 1994).

"10 Protocol Layering", TCP/IP, vol. I, pp. 139–144 (1991).

RFC 793, "Transmission Control Protocol—DARPA Internet Program Protocol Specification", Postel, ed., pp. 1–87 (1981).

RFC 1122, "Requirments for Internet Hosts", Branden, ed., pp. 1–116 (1989).

Roberts, L.G., "Explicit Rate Flow Control", 1roberts@ziplink.net;http://www.ziplink.net/1roberts/Ex-...ate/Explicit–Rate–Flow–Control.htm, pp. 1–14 (Apr. 1997).

Thomas, S.A., "IPng and the TCP/IP Protocols", John Wiley & Sons, Inc., pp. 239–240, 1996. "20.3 Sliding Windows", TCP/IP Illustrated, vol. 1, pp. 280–284 (1991).

"20.3 Sliding Windows", TCP/IP Illustrated, vol. 1, pp. 280–284 (1991).

"TCP: Flow Control and Adaptive Retransmission", TCP/IP, vol. II, pp. 261–283 (1991).

"2.5 The Idea Behind Sliding Windows", TCP/IP, vol. 1, pp. 175–177 (1991).

"12.10 Variable Window Size and Flow Control", TCP/IP, vol. 1, pp. 182–194 (1991).

Fig. 2C
( Step 228 of Fig. 2B )

FIG. 2D
(Step 232 of Fig. 2B)

FIG. 2E

Fig. 2F
( Step 264 of Fig. 2D )

Fig. 2G
( Step 264 of Fig. 2D )

Fig. 2H
( Step 282 of Fig. 2E )

Fig. 21

METHOD FOR EXPLICIT DATA RATE CONTROL IN A PACKET COMMUNICATION ENVIRONMENT WITHOUT DATA RATE SUPERVISION

CROSS-REFERENCE TO RELATED APPLICATION

The present application is a continuation application of U.S. patent application Ser. No. 09/944,746 filed Aug. 31, 2001, now U.S. Pat. No. 6,741,563, which is a continuation application of U.S. patent application Ser. No. 09/300,036 filed Apr. 27, 1999, now U.S. Pat. No. 6,298,041, which is a division application of U.S. patent application Ser. No. 08/742,994 filed Nov. 1, 1996 now U.S. Pat. No. 6,038,216, all naming Robert L. Packer as inventor and incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to digital packet telecommunications, and particularly to data flow rate control at a particular layer of a digitally-switched packet telecommunications environment normally not subject to data flow rate control wherein data packets are communicated at a variety of rates without supervision as to rate of data transfer, such as under the TCP/IP protocol suite.

The widely-used TCP/IP protocol suite, which implements the world-wide data communication network environment called the Internet and is employed in local networks also (Intranets), intentionally omits any explicit supervisory function over the rate of data transport over the various media which comprise the network. While there are certain perceived advantages, this characteristic has the consequence of juxtaposing very high-speed packets and very low-speed packets in potential conflict and the resultant inefficiencies. Certain loading conditions can even cause instabilities which could lead to overloads that could stop data transfer temporarily. It is therefore considered desirable to provide some mechanism to optimize efficiency of data transfer while minimizing the risk of data loss.

In order to understand the exact context of the invention, an explanation of technical aspects of the Internet/Intranet telecommunications environment may prove helpful.

Internet/Intranet technology is based largely on the TCP/IP protocol suite, where IP is the network level Internet Protocol and TCP is the transport level Transmission Control Protocol. At the network level, IP provides a "datagram" delivery service. By contrast, TCP builds a transport level service on top of the datagram service to provide guaranteed, sequential delivery of a byte stream between two IP hosts.

TCP has 'flow control' mechanisms operative at the end stations only to limit the rate at which a TCP endpoint will emit data, but it does not employ explicit data rate control. The basic flow control mechanism is a 'sliding window', a time slot within an allowable window which by its sliding operation essentially limits the amount of unacknowledged transmit data that a transmitter can emit.

Another flow control mechanism is a congestion window, which is a refinement of the sliding window scheme involving a conservative expansion to make use of the full, allowable window. A component of this mechanism is sometimes referred to as 'slow start'.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will 'back-off', i.e., inhibit transmission in increasing multiples of the base RTT average as a reaction to consecutive packet loss.

Bandwidth Management in TCP/IP Networks

Bandwidth management in TCP/IP networks is accomplished by a combination of TCP end systems and routers which queue packets and discard packets when some congestion threshold is exceeded. The discarded and therefore unacknowledged packet serves as a feedback mechanism to the TCP transmitter. (TCP end systems are clients or servers running the TCP transport protocol, typically as part of their operating system.)

The term 'bandwidth management' is often used to refer to link level bandwidth management, e.g. multiple line support for Point to Point Protocol (PPP). Link level bandwidth management is essentially the process of keeping track of all traffic and deciding whether an additional dial line or ISDN channel should be opened or an extraneous one closed. The field of this invention is concerned with network level bandwidth management, i.e. policies to assign available bandwidth from a single logical link to network flows.

Routers support various queuing options. These options are generally intended to promote fairness and to provide a rough ability to partition and prioritize separate classes of traffic. Configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users.

Routers can only control outbound traffic. A 5% load or less on outbound traffic can correspond to a 100% load on inbound traffic, due to the typical imbalance between an outbound stream of acknowledgments and an inbound stream of data.

A mechanism is needed to control traffic which is more efficient in that it is more tolerant of and responsive to traffic loading.

As background, further information about TCP/IP and the state of the art of flow control may be had in the following publications:

Comer, Douglas. Internetworking with TCP/IP. Vol. I. Prentice Hall, 1991.

Comer, Douglas and Stevens, David. Internetworking with TCP/IP. Vol. II. Design, Implementation, and Internals. Prentice Hall, 1991.

W. Richard Stevens, TCP/IP Illustrated. Vol. I—The Protocols. Addison-Wesley. 1994.

RFC 793. Transmission Control Protocol. Postel, 1981.

RFC 1122. Host Requirements. Braden 1989.

A particularly relevant reference to the present work is:

Hari Balakrishnan, Srinivasan Seshan, Elan Amir, Randy H. Katz. Improving TCP/IP Performance over Wireless Networks. Proc. 1st ACM Conf. on Mobile Computing and Networking, Berkeley, Calif., November 1995.

The above document reports efforts of a research group at the University of California at Berkeley to implement TCP 'interior spoofing' to mitigate the effects of single packet loss in micro-cellular wireless networks. Its mechanism is the buffering of data and performing retransmissions to preempt end to end RTO. It is a software mechanism at a wireless network based station which will aggressively retry transmission a single time when it infers that a single packet loss has occurred. This is a more aggressive retransmission than the normal TCP RTO mechanism or the 'quick recovery' mechanism, whereby a transmitter retransmits after receiving N consecutive identical acknowledgments when there is a window of data pending acknowledgment.

Sliding window protocols are known, as in Corner, Vol. I: page 175. Known sliding window protocols are not time based. Rate is a byproduct of the characteristics of the network and the end systems.

SUMMARY OF THE INVENTION

According to the invention, a method for explicit network level data rate control is introduced into a level of a packet communication environment at which there is a lack of data rate supervision to control assignment of available bandwidth from a single logical link to network flows. The method includes adding latency to the acknowledgment (ACK) packet of the network level and adjusting the reported size of the existing flow control window associated with the packet in order to directly control the data rate of the source data at the station originating the packet.

Called direct feedback rate control, the method comprises a mechanism that mitigates TCP packet level traffic through a given link in order to manage the bandwidth of that link. A software mechanism to implement the function may be a software driver, part of a kernel of an operating system or a management function implemented on a separate dedicated machine in the communication path.

The invention has the advantage of being transparent to all other protocol entities in a TCP/IP network environment, For example, in the connections controlled according to the invention, it is transparent to TCP end systems (i.e., end systems using the TCP protocol).

The invention will be better understood upon reference to the following detailed description in connection with the accompanying drawings.

BRIEF DESCRIPTION OF THE DRAWINGS

FIGS. 2A–2I depict flowcharts of a particular embodiment according to the invention.

DESCRIPTION OF THE SPECIFIC EMBODIMENTS

Figure 1:
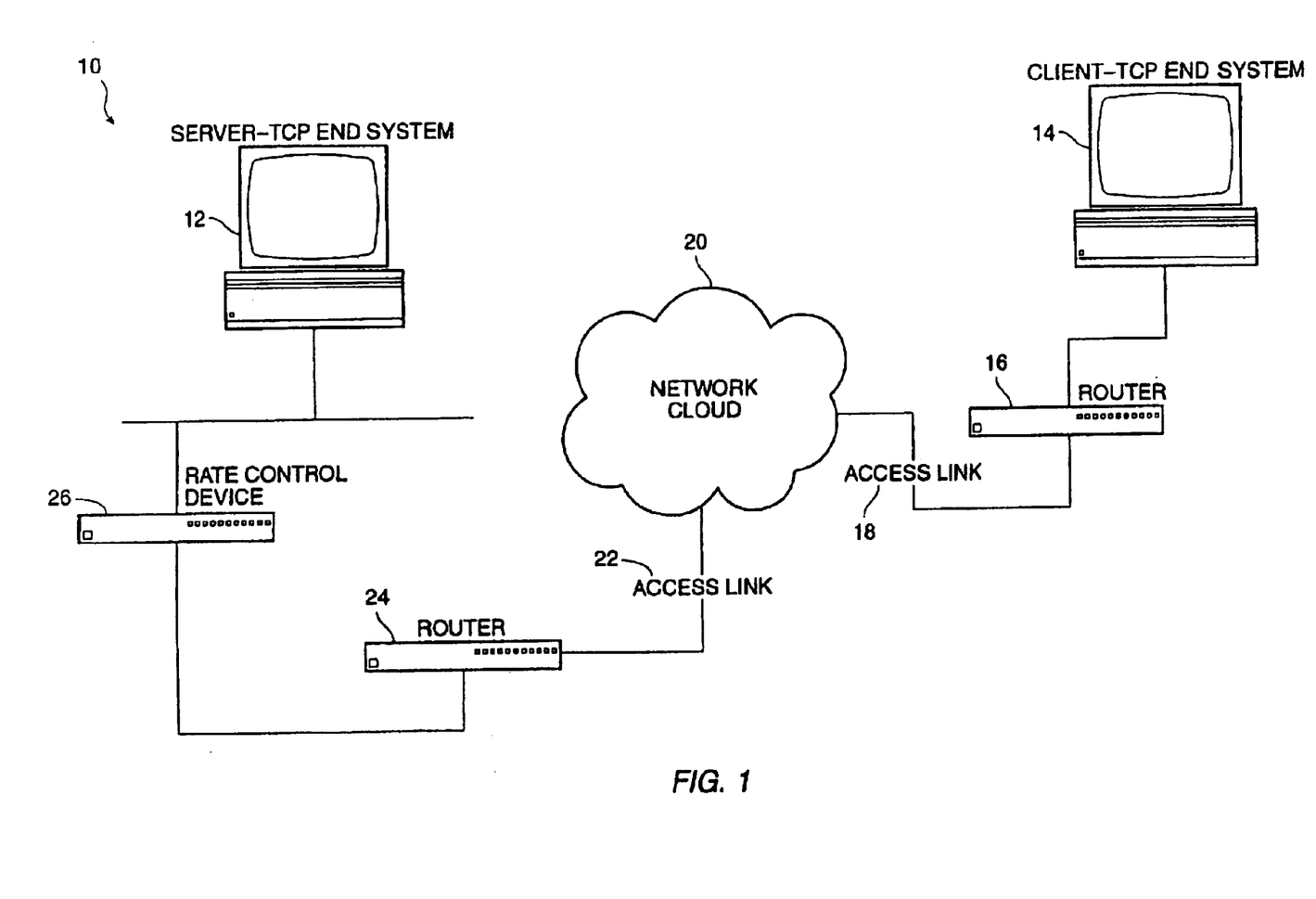
FIG. 1 is a block diagram of a system according to the invention.

Referring to FIG. 1, a system 10 which uses the invention comprises a first TCP end system 12, such as a server device, a second TCP end system 14, such as a client device, which is connected through a first router 16 and thence via a first access link 18 into a network cloud 20 of a character as hereinafter explained, which in turn provides a logical connection via a second access link 22 to a second router 24. According to the invention, there is provided between at least one of the end systems 12 and one of the routers 24 a rate control device 26 which is operative to control the rate at which a TCP transmitter can emit packets. In this invention, rate control is accomplished by (1) delaying the transmission of an acknowledgment, which may be a special packet, (known as an ACK) issued by the end system 12 or 14; and/or by (2) modifying the report of the length of the receive window in those same packets; and/or by (2) generating acknowledgments substantially independently of the acknowledgments generated by the end receiving station. The rate control device 26 is preferably placed at the end system acting as the server, but a rate control device may be placed adjacent any system in a path for data. At the server, it is most effective in controlling flow rate because it typically receives and relays the bulk of the traffic of interest.

Several factors are employed to weight the length of the added acknowledgment delay: the amount of data being acknowledged, the measured and smoothed round trip time, the targeted transmission rate, and the mean of the deviation between the measured and smoothed roundtrip time.

The direct feedback rate control mechanism may be incorporated conveniently into computer-executable code, assuming the end system or the router is programmable. It can be used in an open loop environment or it can be used with a rate monitoring mechanism that provides an indication of flow rate.

The following is a detailed description of a specific embodiment of a direct feedback rate control mechanism expressed in pseudocode. For example, the pseudo-code explains a mechanism of generating acknowledgments, including substituting acknowledgments. This pseudo-code also addresses specifics of the TCP environment. It should be noted that latency and the sliding window flow control can be implemented anywhere in the data path.

According to an embodiment of the present invention, a method for controlling data rate of data packets in a digital data packet communication environment is provided. This environment employs TCP/IP protocols and has a plurality of interconnected digital packet transmission stations. TCP/IP data packet communication environments lack explicit end-to-end data rate supervision, such as that found in ATM or Frame Relay systems. In this invention, a first digital packet transmission station sends at least one source packet to a second digital packet transmission station over the network. The first digital packet transmission station waits for typically one acknowledgment packet before sending additional source packets. The second digital packet transmission station sends an acknowledgment packet toward the first digital packet transmission station after receipt of the at least one source packet.

The second digital packet transmission station can thus establish a limit on explicit rate of emission of packets from the first transmission station to the second transmission station. It invokes this limit by the timing of transmission of the acknowledgment packet from the second digital packet transmission station to the first digital packet transmission station. Specifically, the second digital packet transmission station will insert a latency or delay in issuance of the acknowledgment packet. The latency will be based upon the selected limit. The latency can be invoked at any point traversed by the acknowledgment packet by delaying propagation of the acknowledgment packet through that point. One way this is done is by intercepting the acknowledgment packet at an intermediate point, and rescheduling it and reusing it, i.e., substituting a duplicate acknowledgment packet at a delay from normal propagation. An alternative to the duplicate substitution is the substitution of a sequence of values which include the acknowledgment sequence indicators. The substitution sequence might also include other indicia, for example, an indication of a suitable window size to be communicated to the first transmission station. These indicators serve to signal to the first transmission station the information needed to repackage groupings of packets, which also imposes an upper limit and explicit transmission rate.

Substitute acknowledgment packets can be generated at any point of latency in response to groupings of packets from the first digital packet transmission station. The acknowledgments and the groupings can be generated without correlation to time, range of data being acknowledged, window size being advertised to the first transmission station and number of acknowledgments. The selection of the latency time in theory can be a manually preset value. Alternatively it can be selected based on a simple formula relating latency to explicit maximum rate of transmission. Since the rate of emission of packets from a source or first transmission station to the second transmission station is a limited by the fact that acknowledgments must be received before the next emission of a packet or grouping of packets, the latency of acknowledgment imposes an upper bound on explicit transmission rate.

Figure 2A:
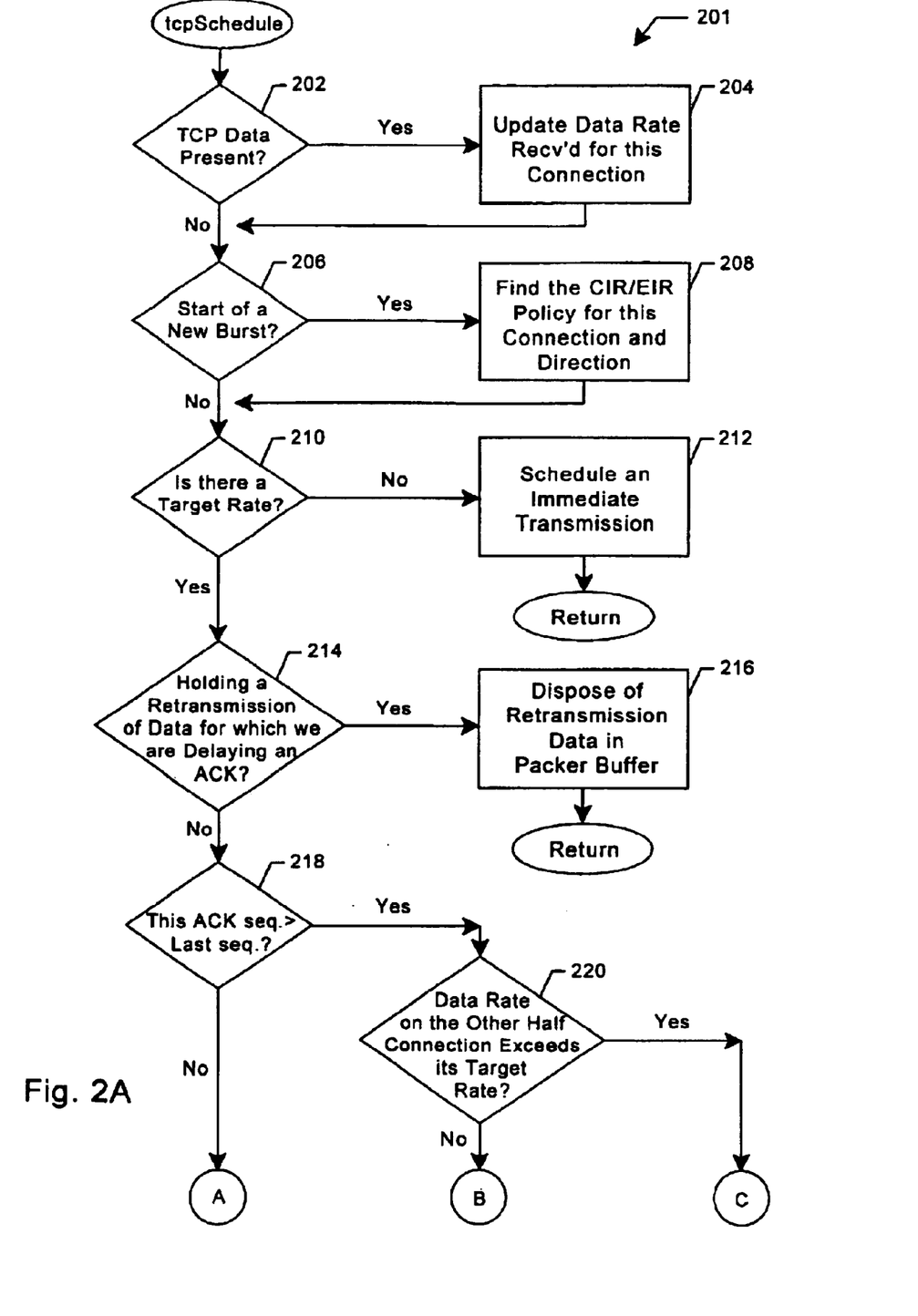

FIG. 2A depicts a flow chart 201 of processing steps in the subroutine tcpSchedule. This routine is invoked for every TCP segment to schedule its emission. In a decisional step 202, a check is made whether there is TCP data present. If this is so, then in a step 204 the data rate received for this connection is updated and processed. Otherwise, or in any event, processing continues with a decisional step 206 wherein a check is made whether the packets being tested are the start of a new burst. If this is so, then in a step 208, an appropriate policy for this connection and this direction of traffic flow is found. This yields a combination of CIR (committed information rate) and EIR (excess information rate). Otherwise, or in any event, processing continues with a decisional step 210 wherein a check is performed to see if there is a target rate associated with this flow. If there is no target rate, then in a step 212, the packet is scheduled for an immediate transmission after which processing returns. Otherwise, if there is a target rate for this particular flow, then in a decisional step 214, a check is performed to see if an acknowledgment packet or sequence (ACK) for the outbound retransmission of TCP data is being retained. This check determines whether: 1) there is TCP data AND 2) it is a retransmitted data packet and 3) an ACK is being retained for this data. If all these conditions are true, the retransmitted data packet is discarded in a step 216. A buffer containing the packet is cleared and processing returns. This step ensures that there is no retransmission caused by our own acknowledgment delay. If this is not so, then in a step 218, a check is made to see if this acknowledgment (ACK) sequence is greater than the last forwarded acknowledgment sequence. If this is so, then in a decisional step 220, a check is made to see if the data rate on the other half connection (data flowing in the other direction along this connection) exceeds its target rate.

Figure 2B:
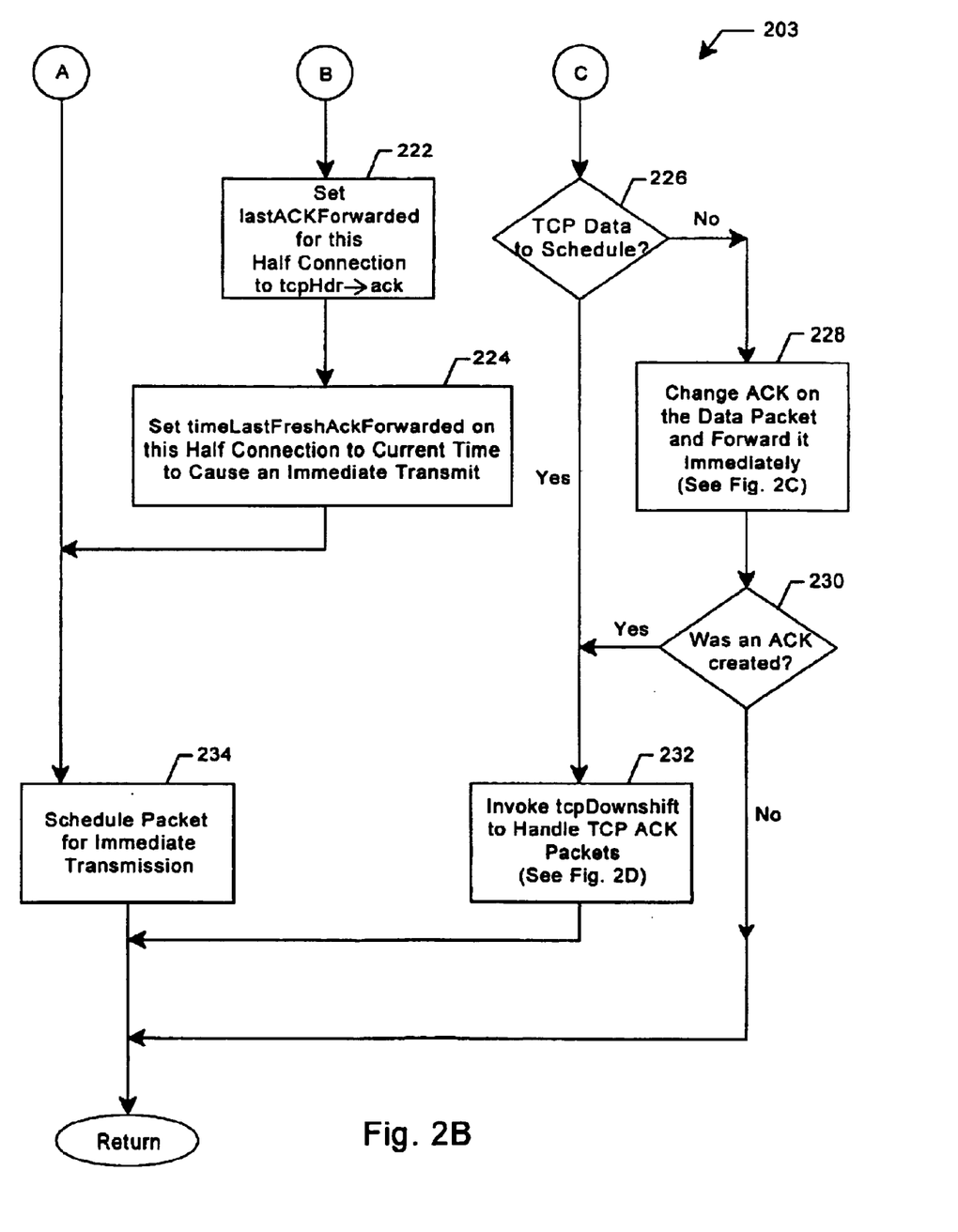

FIG. 2B depicts a continuation flow chart 203. If the test in step 218 in FIG. 2A of whether this ACK sequence is greater than the last forwarded ACK sequence fails, then processing continues with a step 234 in FIG. 2B, wherein the packet is scheduled for immediate transmission and then processing returns. If the test of decisional step 220 in FIG. 2A, of whether the data rate on the other half connection exceeds its target rate, fails, then processing continues with a step 222 in FIG. 2B, wherein a last ACK forwarded (last acknowledgment forwarded) variable is set for this particular half connection to tcphdr pointing on ACK. Then in a step 224, variable timeLastFreshAckForwarded for this half connection is set to the current time in order to cause an immediate transmit. Then in step 234, the packet is scheduled for immediate transmission and processing returns. Finally, if the test of step 220 in FIG. 2A, whether the data rate on the other half connection exceeds its target rate, is true, then processing continues with a decisional step 226 in FIG. 2B, in which a check is made whether there is TCP data to schedule. If this is not so, then in a step 228, a procedure tcpSeparateData is invoked in order to change the ACK value on the data packet and forward it immediately. Then in a decisional step 230, a test is performed to determine whether a new ACK was created. If step 230 is not true, then the processing returns. Otherwise a new ACK was created, so processing continues with a step 232, in which routine tcpDownShift is invoked to handle TCP ACK packets. After step 232, processing returns. If the test in decisional step 226 fails because there is no TCP data to schedule, then processing continues directly with step 232 to invoke tcpDownShift to handle TCP packets. After step 232, processing returns.

Figure 2C:
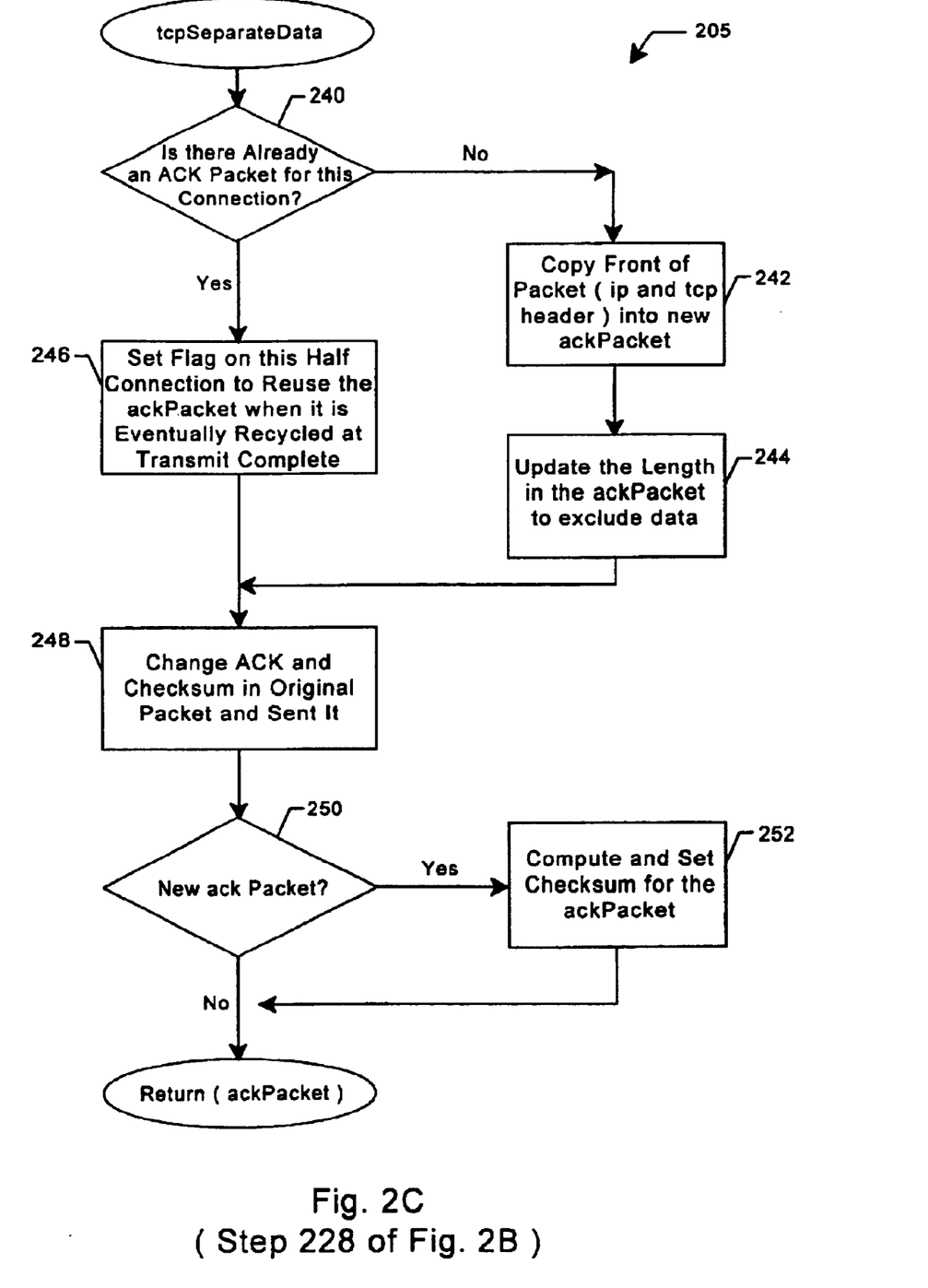

FIG. 2C depicts a flow chart 205 of the process steps of routine tcpSeparateData which is step 228 of FIG. 2B. This subroutine is invoked by routine tcpSchedule to separate data from IP and TCP headers, assign it an older (i.e., prior) ACK and schedule the transmission, or to create a new ACK-only packet with specified ACK sequence and to return it. In a decisional step 240, a determination is made whether an ACK packet for this connection already exists. If this is not so, then a new ACK packet is created. In a step 242, the front of the packet, i.e. the IP and TCP headers, is copied into the newly created ACK packet. Then in a step 244, the length in the newly created ACK packet is updated in order to exclude the length of the data.

If the test in step 240 is true, then in a step 246, a flag for this half connection is set to cause a reuse of the existing ACK packet when it is eventually recycled at transmit complete time. Subsequently, in a step 248, the ACK and checksum in the original packet are altered and it is sent. Then in a decisional step 250, a determination is made whether a new ACK packet was created. If this is so, then in a step 252 the checksum is computed and set for the newly created packet. Otherwise, or in any event, the ACK packet is returned.

Figure 2D:
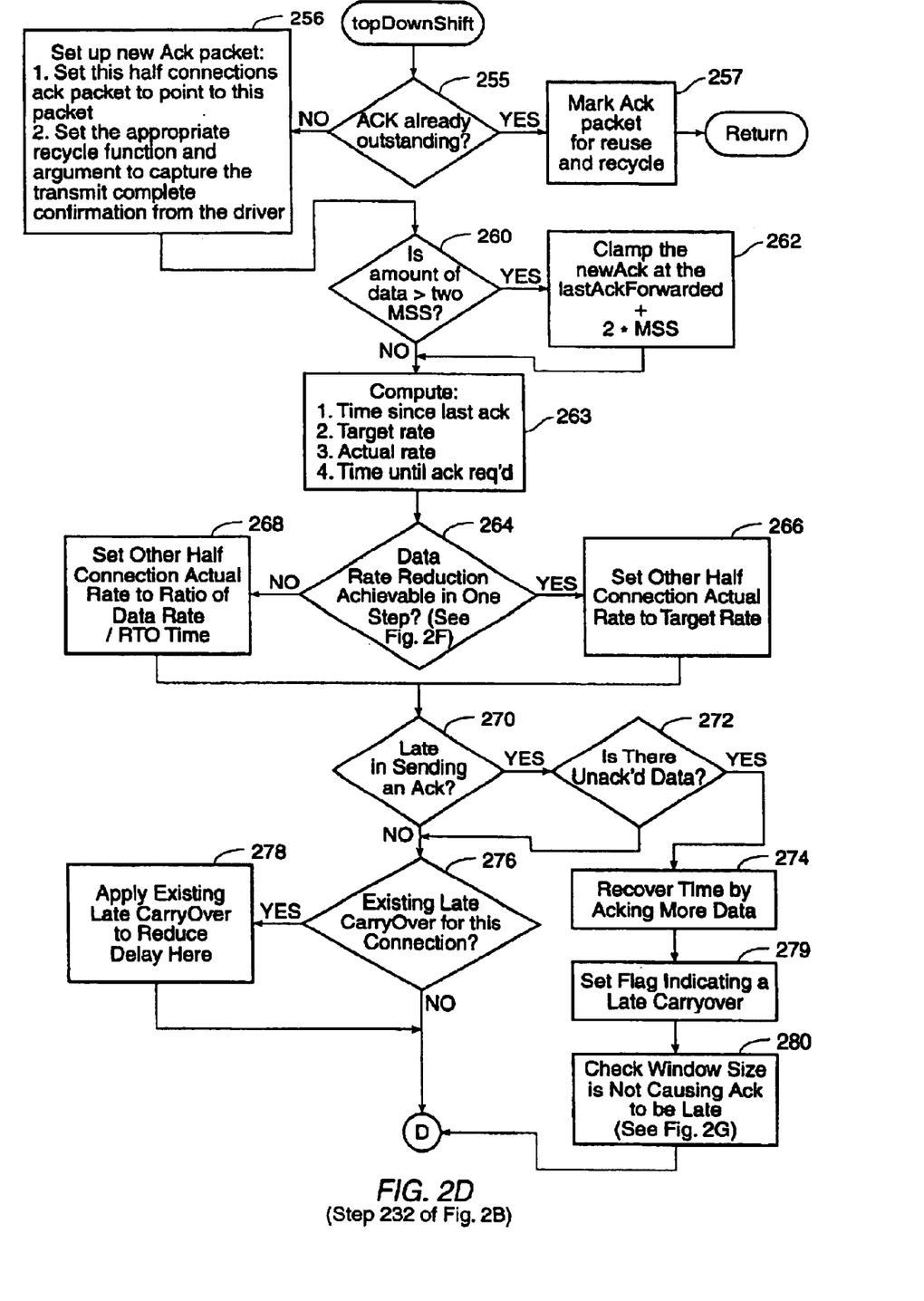

FIG. 2D depicts a flow chart 207 of the processing steps of subroutine tcpDownShift. This subroutine is called from function tcpSchedule and from a recycle routine to schedule an acknowledgment for a half connection which is exceeding its target rate based on information supplied to it. TcpDownShift is the function to choose a latency time to establish a limit on explicit rate of emission of packets from the first transmission station to the second transmission station. One technique for establishing the limit on rate is to generate substitute acknowledgment packets at a point of latency in response to groupings of packets received from the first digital packet transmission station. In a first decisional step 255, a determination is made whether there is already an acknowledgment outstanding for this half connection. If this is so, then in a step 257, that outstanding acknowledgment packet is marked for reuse at the appropriate time after its scheduled transmission and the routine returns to its caller. Otherwise, in a step 256, a new acknowledgment packet is prepared. An indicator for this half connection's acknowledgment packet is set to point to the new acknowledgment packet. A recycle function and argument to capture the transmit complete confirmation from the driver is also associated with the new acknowledgment packet. Then, in a first decisional step 260, a determination is made whether the amount of data to be acknowledged is greater than two times the MSS (Maximum Segment Size). If this is the case, then in a step 262, processing "clamps" the new acknowledgment at the lastAcknowledgementForwarded added to the amount of two times the MSS. This has the effect of limiting the acknowledgment to the position where the last acknowledgment occurred, plus a number of bytes equal to two times the MSS. Otherwise, or in any event, in a step 263, values are computed for: 1) a time since the last acknowledgment was sent for the particular connection, 2) a target data rate for the connection, 3) an actual rate for the connection and 4) an amount of time until the acknowledgment must be sent back to achieve the target data rate. The time to send an acknowledgment is computed from the amount of data sent from the first transmission station and the target rate for the connection. Thus, the timing of the acknowledgment is not dependent upon time, range of data being acknowledged, advertised window size and number of acknowledgments. In a decisional step 264, a determination is made whether data rate reduction can be achieved in a single step without incurring an RTO at the sender. In other words, the question is whether the target rate can be achieved by scheduling just one acknowledgment. If this is so, then in a step 266, the half connection's actual rate is set to the target rate. Otherwise in a step 268, the other half connection's actual rate is set to a ratio of the data rate to the calculated RTO time. Processing then continues with a decisional step 270, in which a determination is made whether the sending of an ACK is late. If this condition is detected, TcpDownShift will try to compensate by acknowledging more data in order to bring the actual data rate closer to the target data rate for this connection. In a decisional step 272, a determination is made whether there is further data which is unacknowledged. If this is the case, then in a step 274, time will be recovered by acknowledging a greater amount of data. In a step 279, a flag is set to indicate a late carryover. Then, in a step 280, the window size is checked to determine that it is not so small as to be causing a late acknowledgment. If the test of decisional step 272 fails, then in a decisional step 276, a determination is made whether there is existing late carryover time for this connection. If a previous carry over exists from a prior late condition, then the current late carry over is adjusted to compensate for the prior late carry over in step 278. Next, TcpDownShift selects the latency for transmitting the acknowledgment that will produce the target data rate on the connection. This latency, stored in variable 'delay', is the greater of the difference between the time until acknowledging, computed above, and zero. This processing is described in a step 281 of FIG. 2E, in which a delay is computed from the difference of the time until the next acknowledgment must be sent to maintain the target data rate and the time since the last acknowledgment was sent. Both of these were computed in step 263 of FIG. 2D. Next, TcpDownShift invokes routine TcpUpdateAckRxWindow in a step 282 to determine whether the advertised receive window is set too large. Processing for TcpUpdateAckRxWindow is described further in FIG. 2H. If this is so, then in step 284 the advertised receive window is scaled down. Otherwise, or in any event, in a step 286, the checksum in the packet header is updated. In a step 288, the acknowledgment packet is scheduled for transmission at a time equal to the present time added to the delay computed in step 281. This processing has chosen a latency time to establish a limit on explicit rate of emission of packets from the first station to the second transmission station. After this processing, control returns to routine TcpSchedule. Then processing returns to the point from which the tcpDownShift was called.

Figures 2D, 2F:
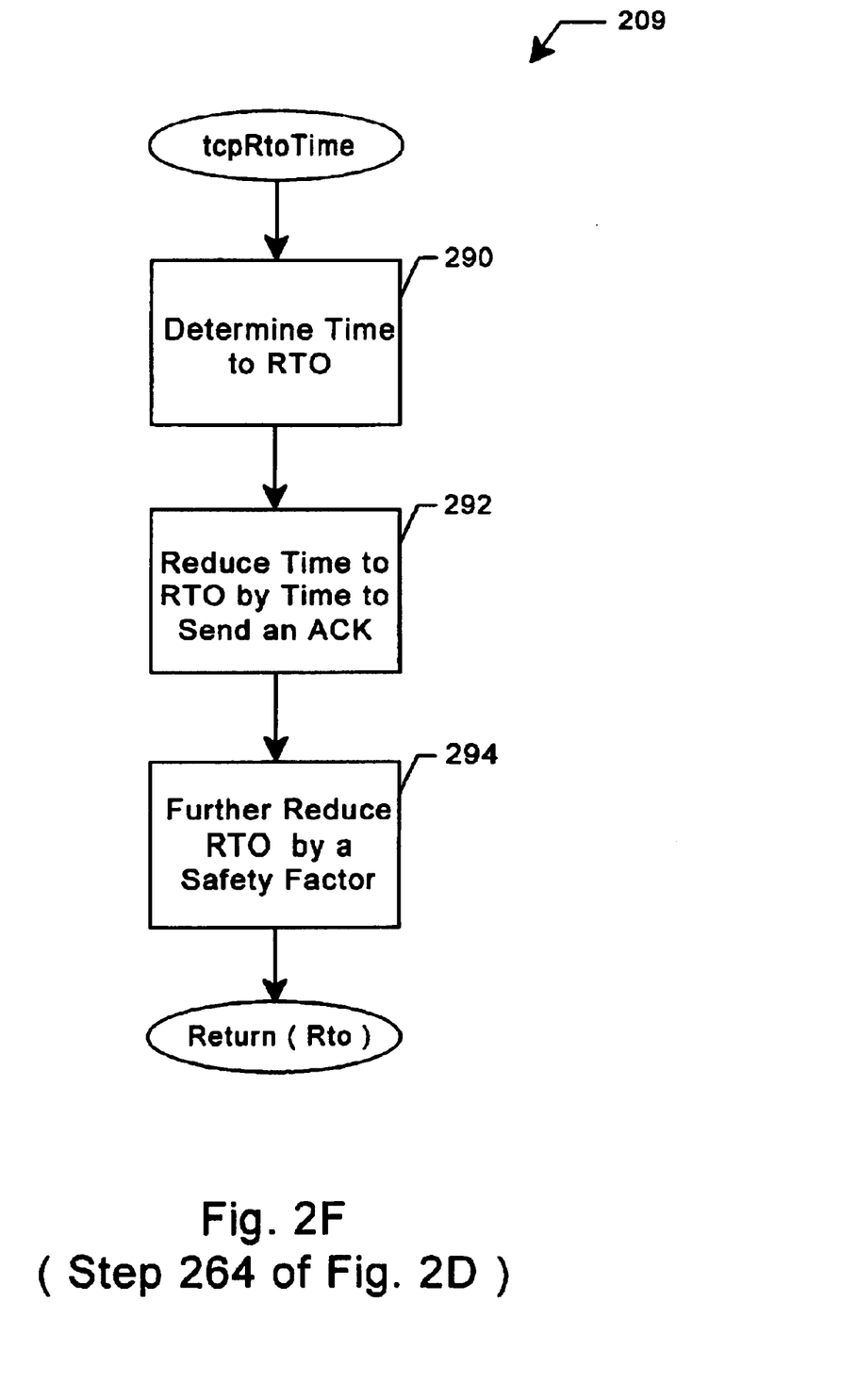

FIG. 2F depicts a flowchart 209 of the process steps of routine tcpRtoTime which is step 264 of FIG. 2B. This subroutine is invoked to return the amount of time until an RTO will occur, minus the amount of time needed to send an ACK to the source of the RTO, minus a safety margin to account for any noise. The time until RTO is derived from maintaining the smoothed round trip time and a mean deviation and is essentially two times the mean deviation, plus the smoothed round trip time. This is intended to be a conservative value. Many implementations may actually set RTO to a greater value. In a step 290, the RTO time is determined. Then in a step 292, the RTO time determined in step 290 is reduced by the time to send an ACK. Finally, in a step 294, the RTO time reduced by the time to send an ACK determined in step 292, is further reduced by a safety factor. Then processing returns.

Figure 2E:
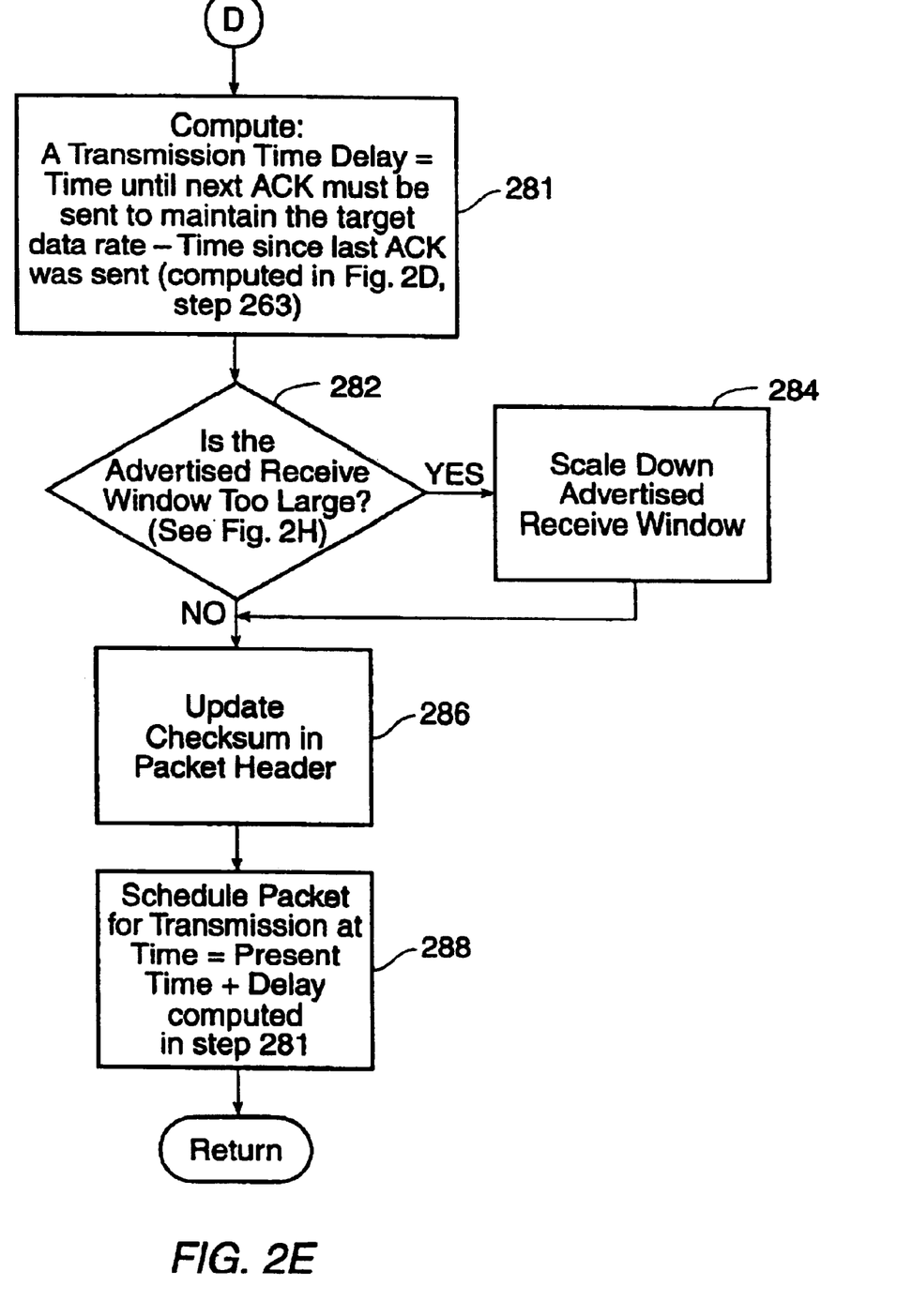
Figure 2G:
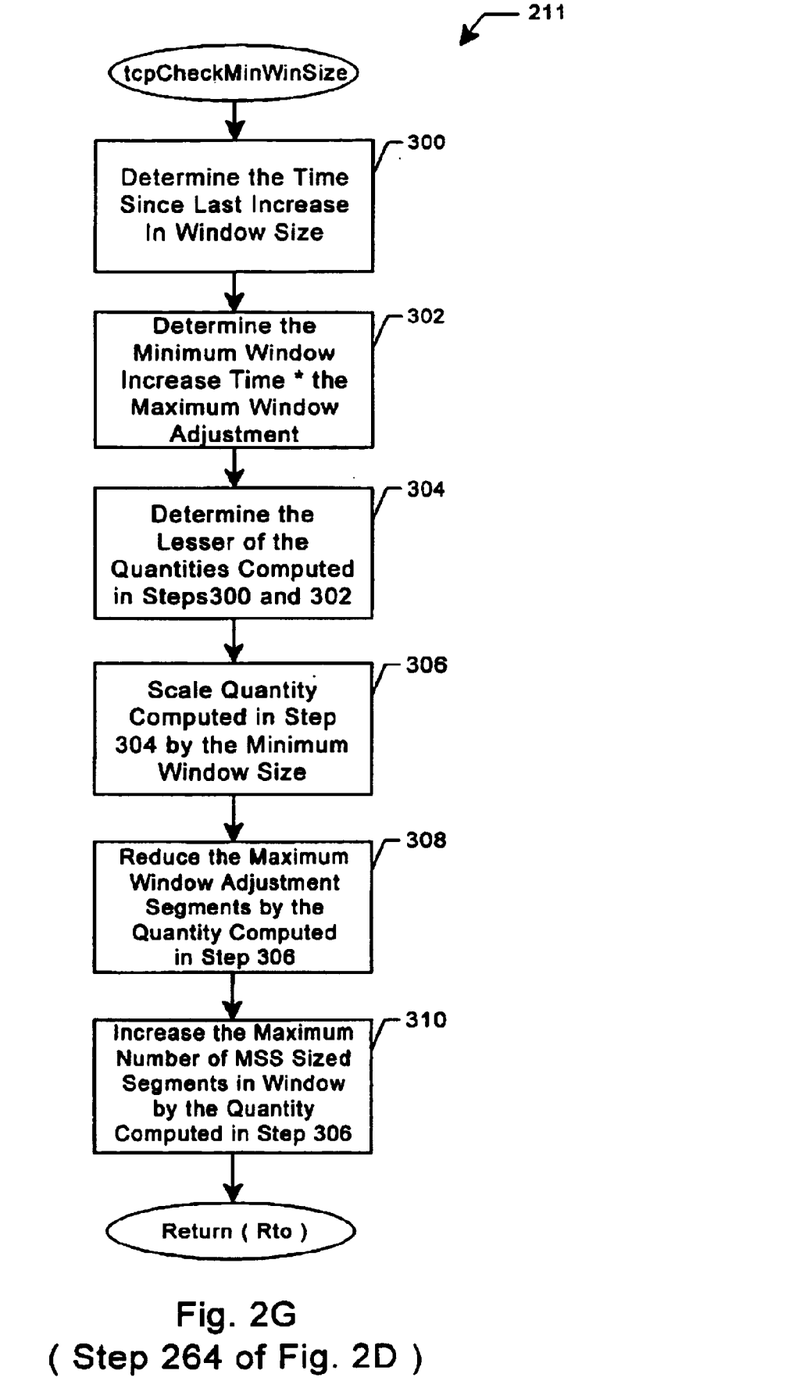

FIG. 2G depicts a flowchart 211 of the process steps of routine tcpCheckMinWinSize which is step 280 of FIG. 2D. This subroutine is invoked by routine tcpDownShift whenever there has been a late ACK in order to see if it is desirable to open up the minimum window size. In a step 300, the time since the last increase in window size is determined. Then, in a step 302, the minimum window increase time is multiplied by the maximum window adjustment. Then, in a step 304, the lesser of the quantities computed in steps 300 and 302 is selected. Then, in a step 306, the quantity computed in step 304 is scaled by the minimum window size. Then, in a step 308, the maximum window adjustment in MSS sized segments is reduced by the quantity computed in step 306. Finally, in a step 310, the window is increased by the quantity of MSS sized segments computed in step 308. Thereupon, processing returns.

Figure 2H:
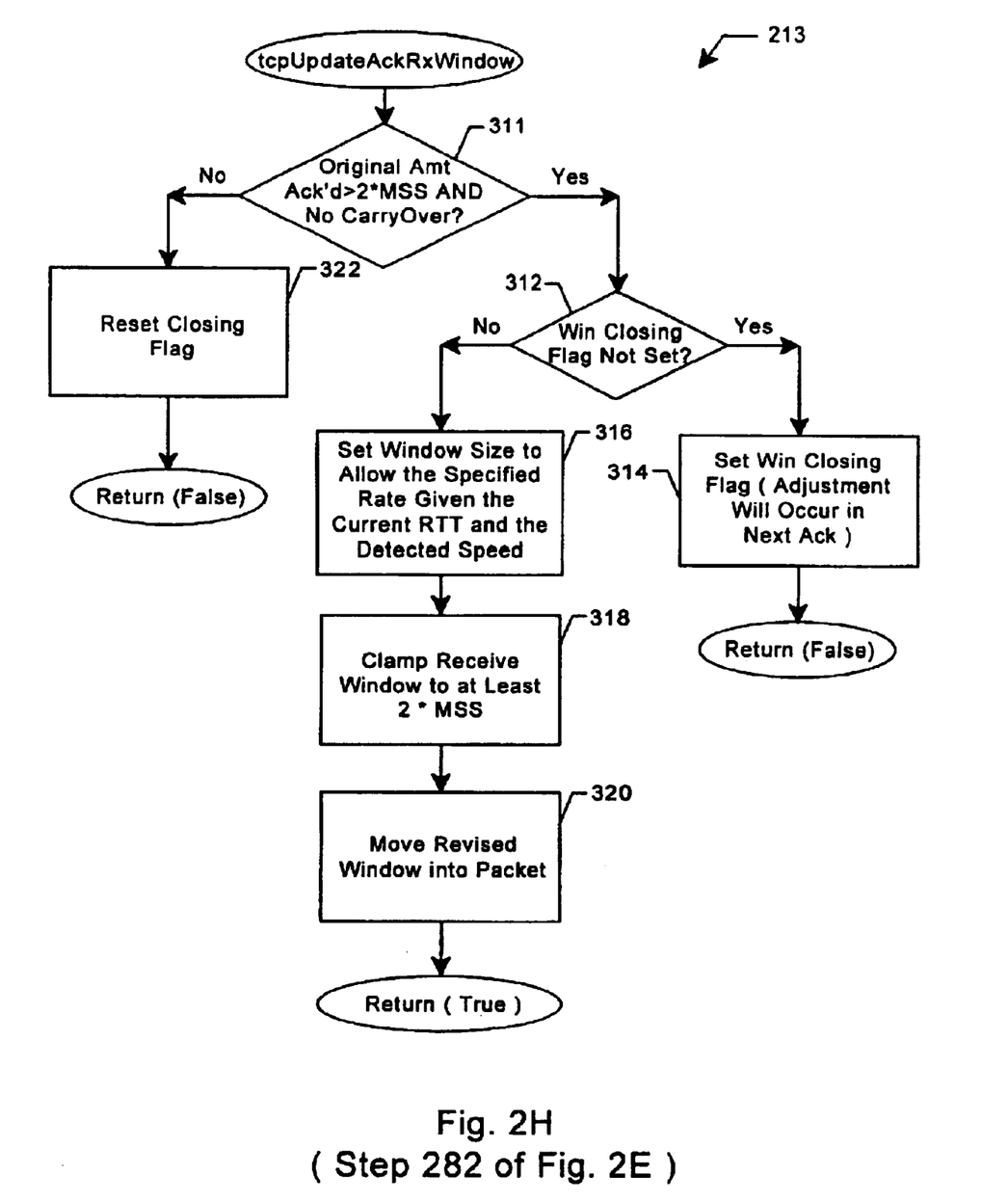

FIG. 2H depicts a flowchart 213 of the process steps of routine tcpUpdateAckRxWindow, which is step 282 of FIG. 2E. The routine TcpUpdateAckRxWindow selects a substitute indicator for the TCP/IP advertised window size. The advertised receive window is TCP/IP's indicator of window size. Basically, it indicates to the other computers on the network the amount of information this computer can receive at any one time. TcpUpdateAckRxWindow returns Boolean true if the window has been updated, otherwise it returns Boolean false. In decisional step 311, the original amount acknowledged is compared to two times the MSS and a determination is made whether no carryover has occurred. If the original amount acknowledged is greater than two times the MSS, and no carry over has occurred, then in a step 312 the WIN closing flag is checked to determine whether it is not set. The WIN closing flag, when set, causes an adjustment to be made in the next acknowledgment rather than this acknowledgment. If the WIN closing flag is not set, then in a step 314, the WIN closing flag is set to cause an adjustment to be made in the next ACK and false is returned. Otherwise, if the WIN closing flag has been set, then in a step 316, the window size is set to allow the specified rate given the current round trip time ("RTT") and the detected speed. Then, in a step 318, the receive window is clamped to at least two times the MSS. Then in a step 320, the revised window is moved into the packet and processing returns a true. If, the original amount acknowledged is less than two times the MSS, or there has been a carryover, then in a step 322 the WIN closing flag is reset and a false is returned. This processing performs the function of selecting a substitute indicator for window size to establish a limit on explicit rate of emission of packets from the first transmission station to the second transmission station.

FIG. 2I depicts a flowchart 215 of the process steps of routine tcpSchedAckEmitted, which is invoked whenever a half connection has had its rate reduced in order to recycle the ackpacket for the half connection. This routine is invoked as an indication that a scheduled acknowledgment packet has been sent. But whenever an acknowledgment packet is scheduled, its sequencing information must be checked to insure that acknowledgments are emitted in the right order. In a decisional step 330, a determination is made whether the half connection is still valid. If this is not so, then processing returns. Otherwise, in a step 332, a lastACKforwarded variable is set for this particular half connection. Then in a step 334, variable timeLastFreshAckForwarded for this half connection is set to the current time in order to cause an immediate transmit. Next, decisional step 336 determines if the last acknowledgment sent corresponds to the last acknowledgment received. If this condition is met, no re-sequencing occurs and processing returns to the caller. Otherwise, in a step 338 substitute sequencing values are determined by setting the new acknowledgment to the last acknowledgment received and setting the TCP data length to zero. Then, in step 340, the next acknowledgment time is computed and routine TcpDownShift is invoked to schedule the packet for transmission. AfterTcpDownShift returns, TcpSchedAckEmitted returns to its caller.

This processing has performed the function of selecting substitute sequence values for recycled acknowledgments in the process for establishing a limit on rate of emission of packets from the first transmission station to the second transmission station.

Direct feedback rate control effectively acts as a mechanism to feed back quality of service information to a TCP end system transmitter 12. Direct feedback rate control does not need to store and forward 'ACK only' packets, as these packets can be mechanically created, or even re-used.

In general, scheduling an exact target time for emission for an ACK only packet is non-problematic because the ACK packet is relatively small and is emitted into the flow opposite the prevailing data flow, which is less likely to be instantaneously congested.

Direct feedback rate control is effective for data flowing in either direction, and can even be applied independently to data flowing in either direction on the same connection. When forwarding TCP packets with data, the specific ACK sequence may be changed to control the transmission rate of the reciprocal direction of the connection.

Direct feedback rate control does not buffer or delay and TCP data, hence there is no system requirement for buffering. This helps make direct feedback rate control scaleable to large numbers of simultaneously managed connections.

Direct feedback rate control may increase or decrease the allotted "bandwidth" to any connection on the fly. When doing so, direct feedback rate control ensures that any decrease in transmission rate will be done smoothly and will not incur a retransmission timeout at the transmitter. Direct feedback rate control will also suppress retransmissions when it is known that their is a 'delayed ack' pending for the retransmitted data.

Direct feedback rate control may pass through multiple equal ACK sequences to allow the 'quick recovery' mechanism to work.

Direct feedback rate control allows for precise, explicit, bi-directional control of individual flows in terms of committed and excess information rate. Further, committed and excess information rate assignments may be set to scale to a given flow's potential speed, e.g. a T1 user in a given traffic class may be assigned a committed rate of 50 Kbps, where a dial-up user may receive a committed rate of 10 Kbps.

Direct feedback rate control does not build up deep transmission queues or toss packets. It delivers data smoothly and consistently. If a given flow is using bandwidth from the excess pool, that share of excess bandwidth may be reduced on the fly. Direct feedback rate control smoothly downshifts and upshifts flow rates in a manner which does not incur retransmission or delay in end systems.

Direct feedback rate control has additional beneficial characteristics. It smoothens peaks in demand bursts on short time scales. Because of the minimal transmission queue, it allows for delay bounded traffic and does not globally flatten the speed of all connections, as would occur with a deep transmission queue. It allows for the explicit control of individual flows whether or not there is congestion, And it provides a capability to secure network bandwidth from malicious or ill behaved users, e.g. to 'debounce' a remote browser's reload button hits.

Because direct feedback rate control controls inbound as well as outbound bandwidth, administrators can select simple policies such as 'net browsing gets only excess bandwidth at low priority'.

Direct feedback rate control can be used for the following:

As a mechanism to enforce policies for bandwidth allocation of committed and excess information rate assignments.

As a mechanism to manage 'inbound' as well as outbound network bandwidth over a given access link.

As a mechanism to assign explicit throughput rates to individual TCP connections.

As a unique mechanism for feeding back quality of service information to TCP end systems.

It should be noted that an inherent attribute of this invention is the ability to assign rates dynamically, although the control mechanisms for assigning rates are beyond the scope of this disclosure.

The invention has now been explained with reference to specific embodiments. Other embodiments will be apparent to one of ordinary skill in the art. It is therefore not intended that this invention be limited, except as indicated by the appended claims.

What is claimed is:

1. A method for allocating bandwidth on a communication link in an operating network, comprising:

receiving a flow of data packets at a receiving system from a sending system on the network via the link;

determining at the receiving system a target rate for the flow on the link;

transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target rate determined by the receiving system; and calculating a period of time for which the receiving system does not transmit data to the sending system.

2. The method of claim 1 wherein a rate at which the transmitted data from the receiving system arrive at the sending system determines the rate at which the sending system transmits the subsequent data packets.

3. The method of claim 1, further comprising:

applying the calculated period of time for which the receiving system does not transmit data to a plurality of flows of a class.

4. The method of claim 1, wherein the data transmitted from the receiving system to the sending system indicates a maximum amount of data that the receiving system will accept from the sending system in a subsequent data transmission.

5. The method of claim 1, wherein the step of calculating the period of time includes using a model of the network.

6. The method of claim 1, further comprising the steps of measuring a bandwidth of the link being used by a class of flows, and using the measured bandwidth as feedback for calculating the period of time.

7. The method of claim 1, wherein the data transmitted by the receiving system to the sending system includes acknowledgment of receipt of a particular data packet in the flow of data packets.

8. The method of claim 1, wherein the target rate is determined by a network protocol process.

9. The method of claim 1, wherein when the link is idle, the target rate equals a full bandwidth of the link.

10. A method for allocating bandwidth on a communication link in an operating network, comprising:

receiving flows of data packets at a receiving system from sending systems on the network via the link;

determining at the receiving system a target rate for the flows on the link;

transmitting data to the sending systems that will cause the sending systems to transmit subsequent data packets to the receiving system at a rate approximating the target rate for the flows of data packets from the sending systems; and for each flow of at least a subset of the flows, calculating a period of time for which the receiving system does not transmit data to the sending system.

11. A computer system for allocating bandwidth on a communication link in an operating network, comprising:

a network interface for receiving a flow of data packets from a sending system on the network via the link; and a processor coupled to the network interface for determining a target rate for the flow on the link, the network interface transmitting data to the sending system in response to the flow of data packets received, the transmitted data providing feedback to the sending system such that the sending system transmits subsequent data packets at a rate approximating the target rate for the flow when responding to the transmitted data;

wherein the processor is configured to calculate a period of time for which the receiving system does not transmit data to the sending system.

12. The computer system of claim 11, further comprising:

memory, coupled to the processor, configured to store a model of a behavior of the network that is used when calculating a period of time for which the receiving system does not transmit data to the sending system.

13. The computer system of claim 11, wherein the processor is configured to assign the flow to a class of flows; and wherein a calculated period of time for which the receiving system does not transmit data to the sending system applies to the flows in said class.

14. The computer system of claim 11, wherein the system is configured to measure a bandwidth of the link being used by a class of flows and to calculate, based on the measured bandwidth, a period of time for which the receiving system does not transmit data to the sending system.

15. The computer system of claim 11, wherein the data transmitted from the receiving system to the sending system include a maximum amount of data that the receiving system will accept from the sending system in a subsequent data transmission.

16. The computer system of claim 11, wherein the target rate is determined by an application program that receives the flow of data packets.

17. A method for allocating bandwidth on a communication link in an operating network, comprising:

receiving a flow of data packets at a receiving system from a sending system on the network via the link;

determining at the receiving system a target rate for the flow on the link; and transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target rate determined by the receiving system; and calculating and applying a period of time for which the receiving system does not transmit data to a plurality of flows of a class;

wherein the target rate is determined by an application program that receives the flow of data packets.

18. The method of claim 17, wherein the step of calculating the period of time includes using a model of the network.

19. The method of claim 17, further comprising the steps of measuring a bandwidth of the link being used by a class of flows, and using the measured bandwidth as feedback for calculating the period of time.

20. A method for allocating bandwidth on a communication link in an operating network, comprising:

receiving a flow of data packets at a receiving system from a sending system on the network via the link;

determining at the receiving system a target rate for the flow on the link; and transmitting data from the receiving system to the sending system in response to the flow of data packets received, the transmitted data providing feedback to the sending system such that when the sending system transmits subsequent data packets to the receiving system, such subsequent data packets are transmitted at a rate approximating the target rate determined by the receiving system;

wherein the target rate is determined by an application program that receives the flow of data packets; and the data transmitted by the receiving system to the sending system includes acknowledgment of receipt of a particular data packet in the flow of data packets.

21. In a data flow control device operative to control the rate of data packets transmitted between first and second transmission stations in a packet communications environment, wherein the first transmission station is operative to transmit at least one packet associated with a data flow to the second transmission station, wait for acknowledgment of at least one transmitted packet before transmitting subsequent packets associated with the flow, and retransmit the at least one packet if an acknowledgment is not received with a period of time, a method comprising delaying transmission acknowledgment packets, corresponding to a first data flow transmitted from the first transmission station to the second transmission station, by a computed delay, wherein the computed delay associated with the delayed acknowledgment packet provides feedback to the first transmission station such that when the first transmission station transmits subsequent packets corresponding to the flow, such subsequent packets are transmitted at a rate approximating a target rate;

receiving a second data flow from the first transmission station, wherein the data flow comprises at least one packet;

storing the data flow in a memory;

if the second data flow is a retransmission of the first data flow, determining whether an acknowledgement packet corresponding to the first data flow is in the memory; and if so, deleting the second data flow from the memory; otherwise, forwarding the second data flow to the second transmission station.

22. The method of claim 21 further comprising classifying the first data flow into one of a plurality of classes to determine the target rate for the first data flow.

23. A method for controlling the rate of data packets transmitted between first and second nodes in a packet communication environment, wherein the first node is operative to transmit at least one packet associated with a flow to the second node, and wait for acknowledgment of at least one transmitted packet before transmitting subsequent packets associated with the flow, said method comprising:

forwarding at least one packet corresponding to a flow from a first node to a second node;

receiving an acknowledgment packet from the second node to the first node, the acknowledgment packet acknowledging at least one packet in the flow transmitted from the first node, wherein the acknowledgment packet received from the second node includes a window size indicator that specifies an allowable range of transmission of data beyond a range of data acknowledged as a window size to be advertised from said second node to said first node;

selecting a substitute window size indicator for said window size indicator to modify the rate of transmission of packets from the first node;

inserting said substitute window size indicator into said acknowledgment packet; and forwarding the acknowledgment packet to the first node.

24. The method of claim 23 wherein the substitute window size indicator is computed based on a target rate for the flow.

25. The method of claim 23 wherein the first and second nodes implement the TCP protocol and wherein the flow is a TCP flow.

26. The method of claim 23 further comprising computing a delay for transmission of the acknowledgment packet to control the rate of transmission of packets from the first node; and delaying the forwarding step by the computed delay.

27. The method of claim 23 wherein the substitute window size indicator is computed based on a metric characterizing an attribute of the communications path between the first and second node.

28. The method of claim 27 wherein the metric is a measured data rate between the first node and the second node.

29. The method of claim 27 wherein the metric is a round trip time between the first node and the second node.

30. A method for controlling the rate of data packets transmitted between first and second nodes in a packet communication environment, wherein the first node is operative to transmit at least one packet associated with a flow to the second node, and wait for acknowledgment of at least one transmitted packet before transmitting subsequent packets associated with the flow, said method comprising:

forwarding packets corresponding to a flow from a first node to a second node;

receiving acknowledgment packets from the second node to the first node, the acknowledgment packets acknowledging at least one packet in the flow transmitted from the first node, wherein the acknowledgment packets received from the second node includes a window size indicator that specifies an allowable range of transmission of data beyond a range of data acknowledged as a window size to be advertised from said second node to said first node;

computing, for at least one acknowledgement packet, a substitute window size indicator for said window size indicator to control the rate of transmission of packets from the first node;

inserting said substitute window size indicator into said acknowledgment packet; and forwarding the acknowledgment packet, modified in the inserting step, to the first node.

31. In a network device disposed in a communications path between at least a first and second node, a method for controlling the rate of data packets transmitted between first and second nodes in a packet communication environment employing the TCP/IP protocol, wherein the nodes in the packet communications environment are operative to transmit at least one packet associated with a flow to the second node, and wait for acknowledgment of at least one transmitted packet before transmitting subsequent packets associated with the flow, said method comprising:

receiving, at the network device, a TCP packet associated with a flow from a first node, wherein the TCP packet includes a window size indicator that specifies an allowable range of transmission of data beyond a range of data acknowledged as a window size to be advertised from said first node to said second node;

selecting a substitute window size indicator for said window size indicator to control the rate of transmission of packets from the second node;

inserting said substitute window size indicator into said TCP packet; and transmitting the TCP packet to the second node.

32. The method of claim 31 wherein the substitute window size indicator is computed based on a target rate for the flow.

33. The method of claim 32 wherein the substitute window size indicator is computed based on a metric characterizing an attribute of the communications path between the first and second node.

34. The method of claim 33 wherein the metric is a measured data rate between the first node and the second node.

35. The method of claim 33 wherein the metric is a round trip time between the first node and the second node.

* * * * *